March 12, 1940.    R. M. NARDONE    2,193,039
CLUTCH MECHANISM
Filed Nov. 5, 1936
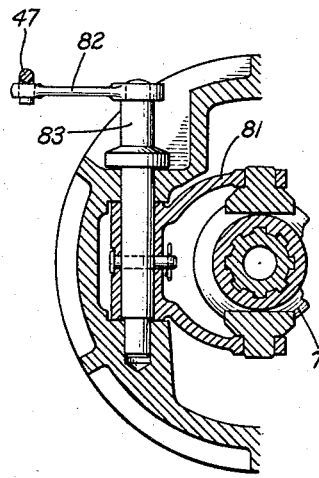
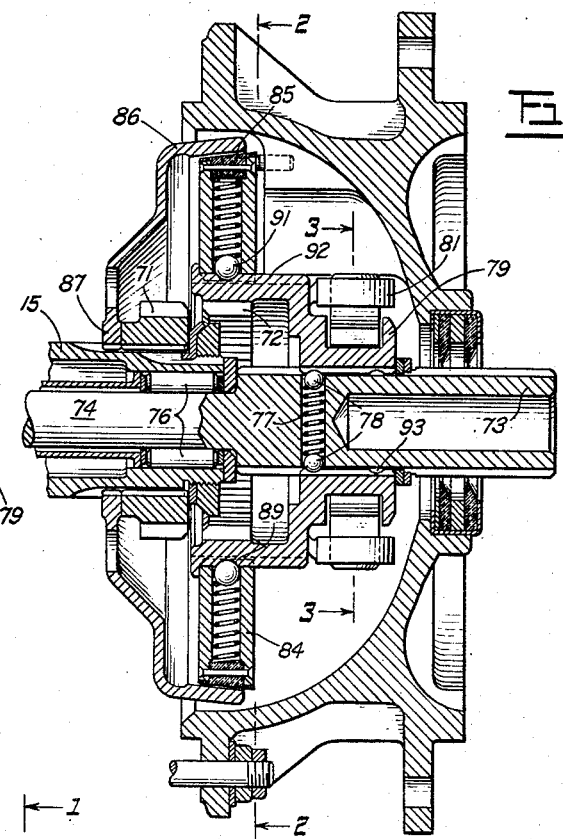
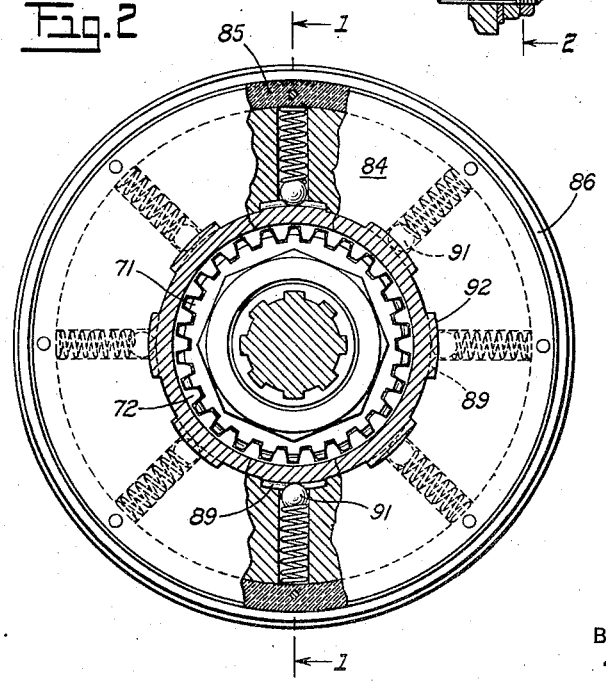
INVENTOR.
Romeo M. Nardone
BY
ATTORNEY.

Patented Mar. 12, 1940

2,193,039

UNITED STATES PATENT OFFICE 2,193,039

CLUTCH MECHANISM

Romeo M. Nardone, East Orange, N. J., assignor to Eclipse Aviation Corporation, East Orange, N. J., a corporation of New Jersey Application November 5, 1936, Serial No. 109,375

2 Claims. (Cl. 192—53)

This invention relates to clutch mechanism, and particularly to clutches of the class including both frictionally and positively driving elements.

The object of the invention is to provide an improved clutch mechanism of the character indicated, the improvements being in those features of construction and mode of operation which are pointed out in the following detailed description of the embodiment of the invention which is illustrated in the accompanying drawing.

It is to be expressly understood, however, that the drawing is for the purpose of illustration only, and is not designed as a definition of the limits of the invention, reference being had to the appended claims for this purpose.

In the drawing—

Fig. 1 is a longitudinal sectional view;

Fig. 2 is a transverse sectional view taken along the line 2—2 of Fig. 1; and

Fig. 3 is a transverse sectional view taken along the line 3—3 of Fig. 1.

The clutch illustrated is of a type functioning normally as a positive non-slipping clutch but initially as a slipping or friction coupling adapted to permit gradual picking up of the load, the elements constituting the normal path of torque transmission being the clutch members 71 and 72, the former of which is keyed or splined to a shaft 15 to be driven, while the internally toothed clutch member 72, adapted to mesh with and rotate the clutch member 71, is rotatably connected to a driving shaft 73. A reduced portion 74 of the shaft 73 preferably extends into the hollow shaft 15 and relative rotation between the said shafts 73 and 15 during initial clutch operation is facilitated by the provision of suitable bearings 76.

Normally the clutch member 72 is yieldably held against axial movement on the shaft 73 by the action of a coiled compression spring 77 upon a set of detents 78 engageable with an annular groove in the teeth or splines of the hub portion 79 of the clutch member 72, but is movable from this position by operation of the shifter mechanism which engages the said hub 79 and includes a yoke 81 pivotally connected with the plunger operating rod 47 by means of arm 82 and rock shaft 83, as indicated in Figs. 1 and 3. Upon actuation of this shifter mechanism clutch member 72 moves to the left and carries with it the driving element 84 to cause the cone-shaped outer rim 85 thereof to move into frictional engagement with the correspondingly shaped inner surface of the driven element 86 the hub portion 87 of which is keyed or splined to the shaft 15 as indicated.

In this manner torque is gradually applied to the driven element 86 and the connection is such that teeth of the clutch member 72 do not become fully meshed with those of the clutch member 71 until after the degree of contact between the parts 85 and 86 has become sufficiently firm to cause the clutch member 72 to slide beyond and overcome the restraining effect of the spring pressed detents 91 which engage the peripheral groove 89 in splines 92 in the outer surface of the clutch member 72 and constitute the means for causing the driving member 84 of the clutch to move with the said clutch member 72 during the initial operation of the clutch. After the clutch has been moved sufficiently to produce full engagement between the teeth 72 and 71 the detents 78 will register with a second annular groove 93 in the splines of the hub 79 and will thus tend to hold the clutch in the engaged position pending return to the non-engaged position indicated in Fig. 1.

What is claimed is:

1. The combination with driving and driven shafts, of a pair of inter-engageable toothed elements for coupling said shafts, to cause the former to rotate the latter, and means for frictionally rotating the driven toothed element prior to the engagement of the driving toothed element therewith, said last-named means including a radially apertured friction shoe carrying element surrounding said driving toothed element, and movable axially therewith to impart rotation to said driven toothed element, means mounted in the radial apertures of said friction shoe carrying element and engaging cammed recesses in the surface of said driving toothed element for causing said driving toothed element and said friction shoe carrying element to move axially as a unit, means for positioning said toothed elements to insure partial inter-engagement thereof prior to ejection of said aperture-mounted means from said cammed recesses, and additional spring means mounted in said radial apertures for producing a frictional drive to said driven element prior to first contact of the driving teeth with the driven teeth.

2. The combination with driving and driven shafts, of a pair of inter-engageable toothed elements for coupling said shafts, to cause the former to rotate the latter, and means for frictionally rotating the driven toothed element prior to the engagement of the driving toothed element therewith, said last-named means including a radially apertured element surrounding said driving toothed element, and movable axially therewith to impart rotation to said driven toothed element, means mounted in the radial apertures of said radially apertured element and engaging cammed recesses in the surface of said driving toothed element for causing said driving toothed element and said radially apertured element to move axially as a unit, means for positioning said toothed elements to insure partial inter-engagement thereof prior to ejection of said aperture-mounted means from said cammed recesses, and additional spring means mounted in said radial apertures for producing a frictional drive to said driven element prior to first contact of the driving teeth with the driven teeth.

ROMEO M. NARDONE.